No. 695,659. Patented Mar. 18, 1902.
W. D. SNYDER.
COUPLING FOR WELL DRILLING TOOLS.
(Application filed Aug. 31, 1901.)
(No Model.)
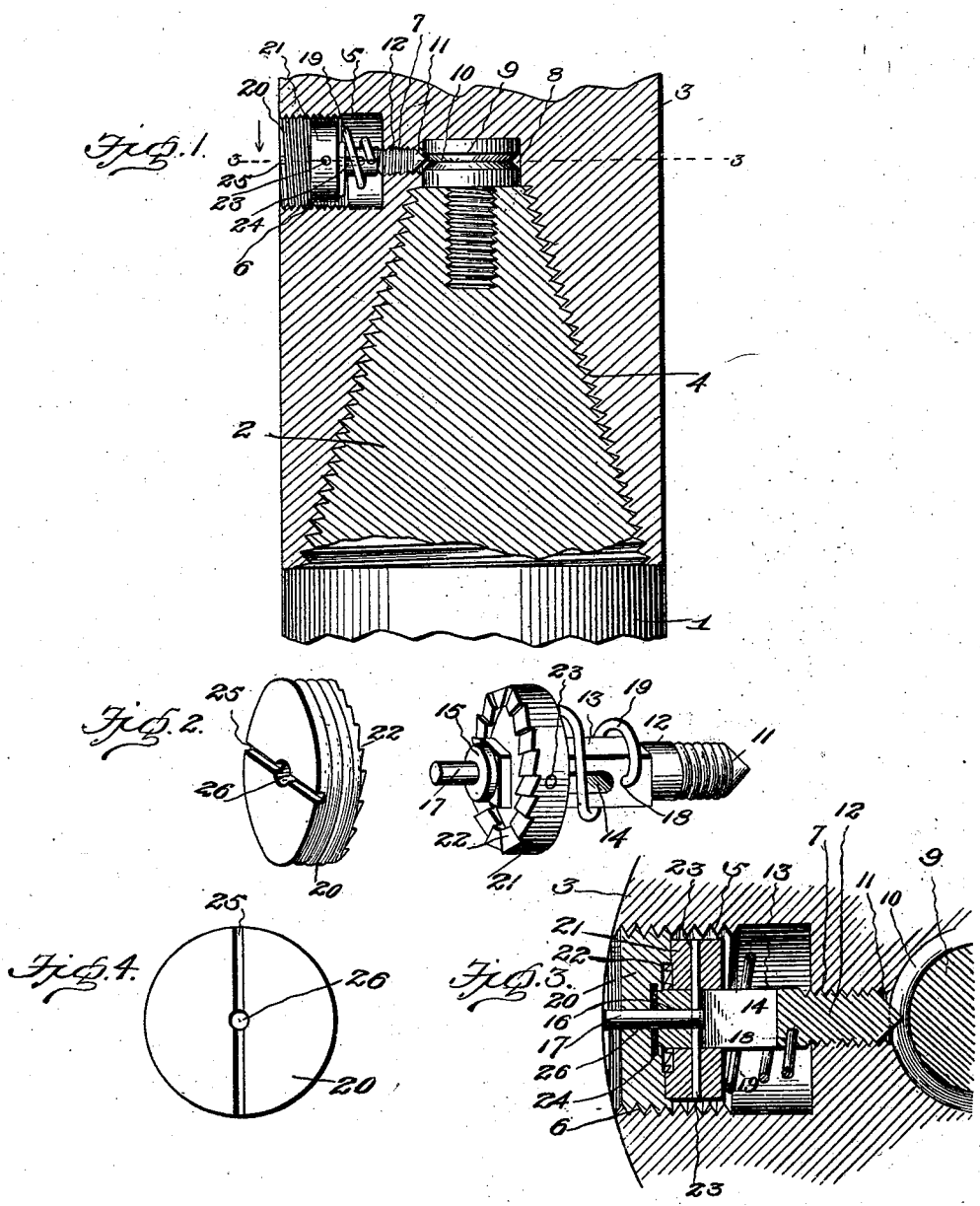

UNITED STATES PATENT OFFICE.

WILLIAM D. SNYDER, OF RIVES, OHIO.

COUPLING FOR WELL-DRILLING TOOLS.

SPECIFICATION forming part of Letters Patent No. 695,659, dated March 18, 1902.

Application filed August 31, 1901. Serial No. 74,031. (No model.)

*To all whom it may concern:*

Be it known that I, WILLIAM D. SNYDER, a citizen of the United States, residing at Rives, in the county of Richland and State of Ohio, have invented a new and useful Coupling for Well-Drilling Tools, of which the following is a specification.

This invention relates to couplings for well-drilling tools, and has for its object to provide a simple and thoroughly effective means for locking the tool within the stock against possibility of accidental separation therefrom when the drill is in use.

A further object is to present a fastening means for the purpose described in which, upon pressure being applied to certain of the parts thereof by the application of a suitable tool, removal of the locking means may readily be effected to permit separation of the tool from the stock.

With these and other objects in view, as will appear as the nature of the invention is better understood, the same consists in the novel construction and combination of parts of a coupling for well-drilling tools, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements herein exhibited may be varied or changed as to shape, proportion, and exact manner of assemblage without departing from the scope of the invention; and in these drawings—

Figure 1 is a view in sectional elevation, exhibiting a portion of a tool shank and stock, showing the parts held assembled by the locking device characterized by this invention. Fig. 2 is a perspective detail view of the locking device with the parts separated. Fig. 3 is a horizontal sectional view taken on the line 3 3, Fig. 1, and looking in the direction of the arrow thereon. Fig. 4 is a detail view in elevation of one of the members of the locking device.

Referring to the drawings, 1 designates a tool-shank provided with the ordinary conical right-hand-threaded screw 2, and 3 a portion of the drill-stock provided with the usual threaded conical socket 4 to be engaged by the conical screw. At a point adjacent to the base of the socket and at right angles thereto there is provided an orifice 5, threaded for a portion of its length, as at 6, and extending from the center of the base of the orifice is a left-hand-threaded opening 7, that terminates in a plain orifice 8, constituting a continuation of the conical socket. The orifice 8 is engaged by a boss 9, which may constitute an integral part of the conical screw 2, or may be, as shown in Fig. 1, a bolt having a left-hand-threaded shank engaging a similarly-threaded orifice in the end of the conical screw. The boss 9 is provided with a peripheral V-shaped groove 10 to be engaged by the inner cone-pointed end 11 of a bolt 12, housed in the orifice 5. The portion of the bolt that engages the left-hand-threaded opening 7 is circular in cross-section and of smaller diameter than the body portion 13 of the bolt, the latter being rectangular in cross-section and provided with a longitudinal slot 14, extending from a point near the circular inner portion of the bolt to a point near the head thereof, while the outer end of the bolt is rounded, as at 15, for a purpose that will presently appear. The outer end or head of the bolt is provided with a central opening 16, which extends into the slot 14 and is designed to be engaged by a pin 17, associated with one of the locking members of the device presently to be described. The bolt near the threaded portion thereof is provided with a transverse opening 18, which is engaged by one terminal of a spring 19, coiled about the bolt and projecting toward the head portion thereof.

The means for locking the bolt 12 within the orifice 5 comprises two disks 20 and 21, each provided on one face with ratchet-teeth 22, the two sets of teeth to interlock when the members are seated in locked position, as shown in Fig. 3. The member 21 is of less cross-diameter than the member 20, whereby to permit it freely to slide within the orifice 5, while the periphery of the member 20 is provided with right-hand screw-threads to engage like threads in the orifice. The member 21 is provided with a transverse orifice, through which passes a pin 23, the same also passing through the inner end of the pin 17, as clearly shown in Fig. 3. As the inner end of the pin 17 projects beyond the head of the bolt 12, it will be seen that on pressure being applied to the outer end of said pin the same will be moved inward, thereby moving the member 21 in a like direction against the stress of the spring 19, outward movement of the member 21 being limited by contact between the pin 23 and the outer wall of the stock 14. The inner face of the member 20 is provided with a recess in which is seated a washer 24, this washer to be borne upon by the rounded portion 15 of the bolt, and by this arrangement entrance of water or the like to the interior of the orifice 5 will be prevented, whereby the parts contained therein will be effectively shielded against rust, it being understood that when the member 20 is seated against the member 21 the said washer will be compressed, and thereby caused tightly or closely to impinge the pin 17, thereby effecting a seal at this point against the intrusion of extraneous matter.

In assembling the locking device with the stock the spring 19 is first associated with the bolt 12. The member 21 is then slipped onto the bolt, the opening in the member being square to conform to the contour of the bolt. The pin 21 is then inserted through the opening 16 in the head of the bolt, and the pin 23 is then passed through the opening in the member 21 and through the opening in the inner end of the pin 17, so that by this arrangement the pin 17, bolt 12, and member 21 are securely assembled. The bolt is then seated in orifice 5 and its threaded extension screwed into the opening 7, with its conical inner end bearing against the wall of the V-shaped groove farthest removed from the joint between the tool-shank and the stop, thereby causing a constant inward drawing action upon the tool-shank, which will tend to cause it to remain seated in the stock. The member 20 is then screwed into the threaded portion of the orifice 5 and is seated firmly upon the head of the bolt 12, with the washer interposed between the two parts, turning of the member 22 to its seat being effected by a screw-driver inserted in a transverse recess 25, provided in the outer face of the member, as clearly shown in Figs. 2 and 4. When thus seated, the pin 17 projects through an opening 26 in the member 20, flush with its outer face, and terminates at this point to obviate the presentation of an obstruction on the periphery of the stock. When the parts are thus assembled, the tool-shank will be positively held against possibility of becoming separated from the stock, as it will be seen that as the threads of the conical screw 2 are right-handed and where the boss 9 is provided with a left-hand threaded shank, as shown, should the conical screw loosen it will at the same time be tightened upon the said shank, and as this is held positively seated in the stock by reason of its interlocked relation with the bolt 12 separation of the stock and tool-shank will therefore be impossible. Further, any tendency on the part of the member 20 to work loose will be positively obviated by the interlocked relation of the ratchet-faces, while any tendency of the bolt 12 to turn or loosen will be checked by reason of coaction between the bolt and the member 20. When it is desired to remove the tool-shank from the stop, the pin 21 is pushed inward, as by a screw-driver, the end of which will engage with the recess 25 in the member 20, so that the member 21 will be forced out of engagement with the member 20, thereby permitting the locking device to be turned, and thus permit separation of the stock and the tool-shank.

Having thus fully described my invention, what I claim as new, and desire to secure by Letters Patent, is—

1. A locking device for well-drilling tools, comprising a bolt, a ratchet mounted for sliding movement thereon and carrying a pin projecting beyond the bolt, and a rotatable ratchet adapted to be turned into engagement with the slidable ratchet and having an opening through which the said pin projects.

2. A locking device for well-drilling tools, comprising a bolt, a ratchet member mounted for sliding movement thereon, a spring bearing against the ratchet member, a push-pin operatively connected with the ratchet member and projecting beyond the outer end thereof, and a rotatable ratchet member adapted to be turned into engagement with the sliding member, and having an opening through which the pin projects.

3. A locking device for well-drilling tools, comprising a bolt having its body portion rectangular in cross-section, and one terminal threaded, the rectangular portion being provided with a longitudinal slot, a slidable ratchet member mounted on the rectangular portion of the bolt, a push-pin seated in a longitudinal opening in the bolt and extending beyond the head thereof, fastening means passing through the ratchet member and the push-pin and engaging the slot in the bolt, and a rotatable ratchet member adapted to be turned into engagement with the slidable ratchet member and provided with an opening for the reception of the said pin.

4. A coupling for well-drilling tools comprising, in combination, a drill having a peripherally-grooved terminal, a stock having a lateral orifice in alinement with the groove, a bolt housed in the orifice and having a conical point engaging the groove, a spring-pressed ratchet member slidable on the bolt and in the orifice, and a threaded ratchet member adapted to be turned into engagement with the slidable ratchet member and to bear upon the head of the bolt.

5. A coupling for well-drilling tools comprising, in combination, a drill having a peripherally-grooved terminal, a stock having a lateral orifice in alinement with the groove, a left-hand-threaded bolt housed in the orifice and having a conical point engaging the groove, a slidable spring-pressed ratchet member mounted on the bolt and in the orifice, a push-pin operatively connected with the said ratchet member, and a right-hand-threaded ratchet member adapted to be turned into engagement with the slidable ratchet member and to bear upon the head thereof, the latter member being provided with an opening through which the said pin projects.

In testimony that I claim the foregoing as my own I have hereto affixed my signature in the presence of two witnesses.

WILLIAM D. SNYDER.

Witnesses:
C. H. HUSTON,
WINNIE LINHAM.